Feb. 13, 1934. P. E. FAUST Re. 19,075

DISPLAY PACKAGE AND CLAMP DEVICE THEREFOR

Original Filed May 26, 1932

INVENTOR:
Paul E. Faust,
BY Alfred E. Tschinger
ATTORNEY.

Reissued Feb. 13, 1934

Re. 19,075

UNITED STATES PATENT OFFICE 19,075

DISPLAY PACKAGE AND CLAMP DEVICE THEREFOR

Paul E. Faust, West Wyomissing, Pa., assignor to Narrow Fabric Company, West Reading, Pa., a corporation of Pennsylvania Original No. 1,931,470, dated October 17, 1933, Serial No. 613,659, May 26, 1932. Application for reissue December 8, 1933. Serial No. 702,621

3 Claims. (Cl. 211—1)

This invention relates to a display unit and clamp device therefor particularly adapted for separably uniting articles of dry goods, such as a spool of thread and a ribbon package, or the like; an object being to provide a novel unit of this type and a clamp device therefor which is inexpensive, simple in construction and which can be quickly and easily applied.

Another object is to provide such a device which is adapted to support the united articles in upright position for purposes of display and comparison.

With these and other objects in view, as will hereinafter appear, the several features of my invention will become readily apparent from the following detailed description of several illustrative embodiments thereof as shown in the accompanying drawing, in which.

Articles of dry goods, such as ribbons etc., are nowadays usually protectively wrapped in cellophane so that their color, quality, texture or gauge can be readily determined without removing the wrapper. In line with this, it has been found advantageous and desirable to directly unite with such a package, a spool of thread, so as to facilitate a comparison of colors. Heretofore, this has been accomplished by various devices which are, however, more or less expensive, troublesome to apply, or unite the package and spool more or less permanently, thereby producing a cumbersome parcel for shipping. Furthermore, such devices provide for displaying the articles on a counter or table in horizontal position only.

Figure 1:
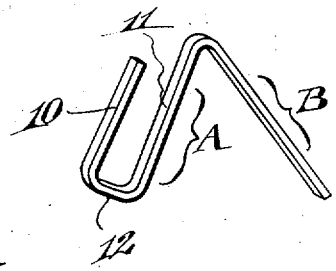
Fig. 1 is a perspective view of a preferred embodiment of my invention.
Figure 2:
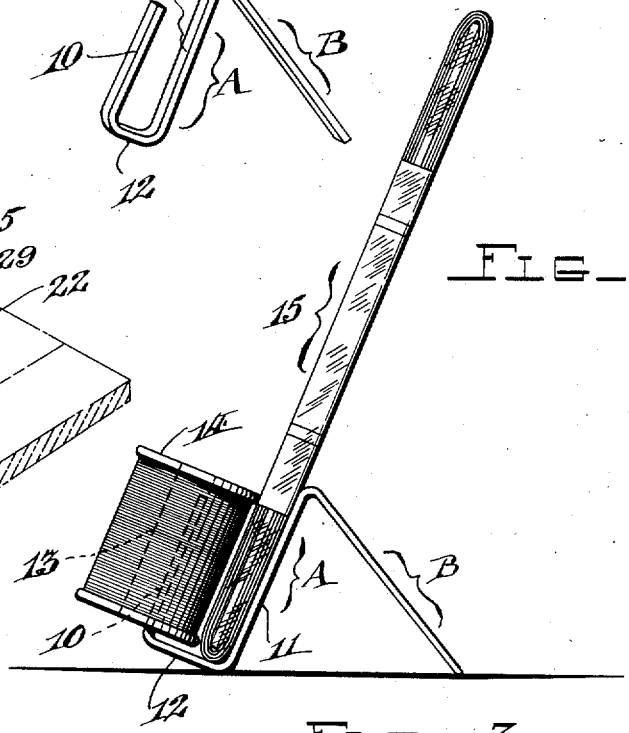
Fig. 2 is a side elevational view, showing a ribbon package and thread spool detachably united and supported in upright position by my novel device.
Figure 3:
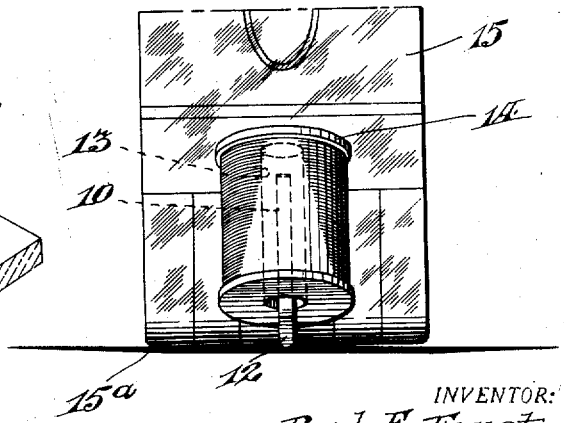
Fig. 3 is a fragmentary front elevational view of Fig. 2.

My invention is primarily directed to the provision of a simplified and inexpensive clamp device which overcomes the objectionable features pointed out; which can be separately and conveniently packed with the articles; which suitably clamps the articles together in a manner to visually present one against the other; and which in the specific embodiment illustrated in Figs. 1 to 3 of the drawing supports the clamped-together articles in upright position, thereby facilitating their display and comparison.

Referring now to the drawing, the preferred embodiment of my invention, illustrated in Figs. 1, 2 and 3, comprises a clamp device made of a piece of substantially flat resilient material, such as metal, bent so as to form a substantially U-shaped part A and a part B inclined to the latter. The U-shaped part A comprises members 10, 11 and 12; the member or forward arm 10 being adapted to extend into the opening 13 of a spool of thread 14 and being inclined somewhat toward the member or rearward arm 11; member 11 being adapted to engage the outside of a cellophane wrapped ribbon package 15; and the member or central portion 12 being adapted to unite the members 10 and 11 and serve as a base or foot. Part B serves as a prop element and cooperates with a corner 15*a* of the package 15 to maintain the spool and package in upright position; member 12, corner 15*a* and the extreme end of part B resting on the table or counter upon which the clamped-together articles are placed.

In applying the clamp, the U-shaped part A is sprung slightly, the resiliency of the material permitting this and functioning to lightly but firmly hold the spool 14 and package 15 together.

Figure 4:
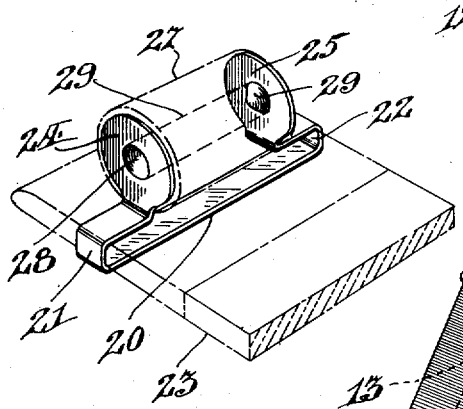
Figs. 4 and 5 are perspective views of modified forms of my invention, the package and spool being indicated in dot-and-dash lines.

The separable clamp device shown in Fig. 4 is made of flat resilient material having a body part 20, bent at 21 and 22 in conformity with the edge-contour of the package and in such manner as to lightly grip a package indicated by the dot-and-dash lines 23. The ends 24 and 25 of the strip are bent at right angles to the body part 20 and function as means for holding the spool indicated by the dot-and-dash lines 27. Protuberances 28 and 29, pressed out centrally of the end members 24 and 25, extend into the ends of the spool opening 29 and serve to centrally position the spool.

Figure 5:
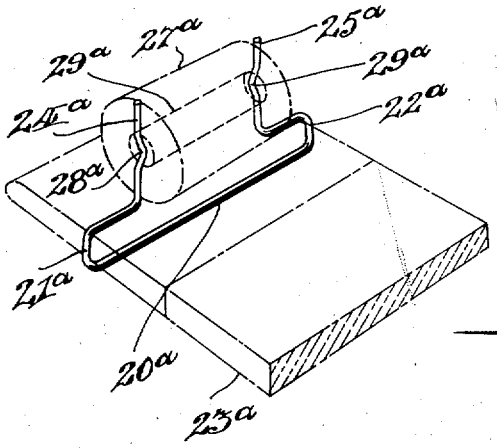

The modification of Fig. 5 is similar to that shown in Fig. 4 except that the clamp device, in this instance, is formed of a piece of round wire. In view of the similarity of construction of the devices of Figs. 4 and 5, I have applied similar reference numerals to the same parts in these figures and have added the superscript "*a*" to the numerals in Fig. 5.

It will be apparent, that any resilient material possessing sufficient rigidity may be utilized to form the clamp devices of my invention, and the latter may be variously colored in order to enhance their appearance and harmonize with the articles held together. Also, that the modified forms of my invention shown in Figs. 4 and 5 can, if desired, be readily provided with a prop element, similar to that shown at B in Figs. 1 and 2, and that the separable clamp device specifically set forth may be further changed and modified in various ways without departing from the invention herein disclosed and hereinafter claimed.

For brevity in the specification and claims, the term "ribbon package" is employed in a generic sense to define a packet or package of ribbon, lace, braid, or other woven, knitted or braided fabrics; the term "thread" is employed to define thread, yarn, or narrow fabrics commonly supplied on spools or bobbins of the character disclosed; and the term "spool wall" defines that part of the spool of thread between the forward arm 10 and the package 15.

I claim:

1. A ribbon package unit comprising in combination, a ribbon package, a spool of thread and a clamp for holding said spool vertically against the package, said clamp comprising a unitary strip of resilient material formed to include a substantially U-shaped member having rearward and forward clamping arms, the forward arm being normally inclined toward the rearward arm, and a central portion joining said arms at the ends thereof and spacing the same appreciably one from the other, the length of said central portion being substantially equal to the thickness of the spool wall plus the thickness of the package, said rearward and forward arms respectively engaging the package and spool and jointly clamping them together in substantially upright position, the rearward arm extending upwardly and including an integral downwardly extending and outwardly diverging brace portion, the inner side of said rearward arm abutting against the rear of said package and said forward arm extending into the hole of the spool and pressing said spool against the front of the package, whereby the spool and a marginal portion of said package are held in abutting relation within said U-shaped body, thereby to visually present the spool in relief against the package-background while affording concealment of said forward arm.

2. A display device for holding a substantially flat ribbon package and a spool of thread against each other in vertical alignment to enable ready visual comparison therebetween, comprising, in combination, a spring clamp formed of a unitary strip of resilient material and including a substantially U-shaped body having rearward and forward clamping portions, the forward portion being normally inclined toward the rearward portion, and a substantially straight central portion joining the bases of said rearward and forward portions and spacing the same appreciably one from the other, the length of said central portion being at least equal to the thickness of the spool wall plus the thickness of the package, said rearward and forward portions being adapted to respectively engage the package and spool to jointly clamp them together in substantially upright position, the rearward portion extending upwardly at a rearward inclination to slightly greater height than the forward portion and including an integral downwardly extending and outwardly diverging brace portion, the inner side of said rearward portion being adapted to engage the rear of said package and said forward portion being arranged to extend into the hole of the spool and to press the circumferential portion of said spool against the front of the lower marginal portion of said package, whereby the outer annular portions of said spool and the lower end of said package are held in abutting relation within said U-shaped body, thereby to visually present the spool in slightly elevated position and at a rearward inclination in relief against an inclined background constituting said ribbon package while the spool affords concealment of the forward portion of said U-shaped body.

3. A ribbon package unit comprising in combination, a ribbon package, a spool of thread and a clamp for holding said spool against the package to enable ready visual comparison therebetween, said clamp comprising a unitary strip of resilient material formed to include a substantially U-shaped member having rearward and forward clamping arms, the forward arm being normally inclined toward the rearward arm, and a central portion joining said arms at the ends thereof and spacing the same appreciably one from the other, the length of said central portion being substantially equal to the thickness of the spool wall plus the thickness of the package, said rearward and forward arms respectively engaging the package and spool and jointly clamping them together, the rearward arm extending in the same direction as the forward arm, the inner side of said rearward arm abutting against the rear of said package and said forward arm extending into the hole of the spool and pressing said spool against the front of the package, whereby the spool and a marginal portion of said package are held in abutting relation with said U-shaped body, thereby to visually present the spool in relief against the package-background while affording concealment of said forward arm.

PAUL E. FAUST.